Nov. 6, 1962  F. J. ZUIDERWEG  3,062,627
ROTATING DISC CONTACTOR
Filed April 22, 1959

INVENTOR:
FREDERIK J. ZUIDERWEG
BY: *Oswald W. Milmore*
HIS ATTORNEY

United States Patent Office 3,062,627
Patented Nov. 6, 1962

3,062,627
ROTATING DISC CONTACTOR
Frederik Johannes Zuiderweg, Amsterdam, Netherlands, assignor to Shell Oil Company, a corporation of Delaware
Filed Apr. 22, 1959, Ser. No. 808,177
Claims priority, application Netherlands Apr. 23, 1958
7 Claims. (Cl. 23—270.5)

The invention relates to a contactor for intimately contacting a continuous liquid phase with one or more phases of fluent material at least partially immiscible therewith, e.g., two at least partially immiscible liquids, a liquid and a dispersion of finely divided solids in a second liquid, a liquid and a gas, or a liquid and finely divided solids. The apparatus is of the type in which several spaced rotor discs are mounted transversely on a shaft which is rotatable within a tubular shell one end of which is higher than the other, e.g., vertical, and toroidal vortex patterns are created within each compartment defined by a pair of adjoining discs. Such apparatus is suitable for effecting intimate contact between phases flowing in countercurrent or in a common direction through the shell, or wherein one phase moves through the shell while the other is held therein or moved intermittently in the opposite or same direction. The invention is applicable, for example, for the solvent extraction of liquid mixtures, such as mineral or fatty or essential oils with one or more selective solvents, or for causing intimate contact between reagents when carrying out chemical reactions, such as reactions between higher olefins and sulfuric acid.

The vortex patterns herein referred to are formed by the dispersal of one of the phases in the other, the latter being a liquid, and by the orderly flow of the dispersion along a path which is radially outward in the region situated adjacently to the plane of spinning disc and reverses near the shell wall and is radially inward toward the axis in a plane offset from the disc.

Apparatus of the general type indicated above are known, e.g., from U.S. Patent No. 2,601,674. In the known apparatus the shell is provided with annular stator baffles mounted approximately midway between each pair of rotor discs to form partly isolated contacting spaces. These baffles guide the liquid streams created by shear from the rotor discs and flowing radially outwards therefrom in such a way that the streams reverse direction at the shell wall and flow back toward the axis along the baffles. In this way the vortex patterns are maintained within the contacting spaces and, in addiiton, the direct, unhampered flow of the fluid along the length of the shell beyond the stator baffles is prevented; instead, only small amounts of the fluids flow between spaces through the central openings in the baffles. In this manner the shell is effectively subdivided into a series of stages which contain fluids of different compositions, thereby permitting multi-stage contacting.

The said stator baffles were heretofore found to be necessary for maintaining the above-described, ordered vortex patterns and to separate the stages. Devices, such as that shown in the U.S. Patent No. 2,139,871, which omitted the stator baffles, did not achieve these desiderata, but merely agitated the liquids, forming a turbulent mixture without setting up the said defined vortex patterns. Mounting of such stator baffles within the shell is, however, costly, particularly in that accurate placement thereof is important, and the contactor would be considerably simplified if they could be eliminated.

It is the principal object of this invention to provide a simplified rotating disc contactor of the type indicated wherein the stator baffles are eliminated but ordered vortex patterns within defined compartments are maintained.

A further object is to provide an improved means for lubricating the bearing of the rotor shaft.

It was now found that the above principal object can be attained by employing within a tubular shell which is mechanically uninterrupted a rotor carrying transverse, axially spaced rotor discs which restrict the open area near the shell wall and have openings which provide ample passages for fluids within the inner part of the discs. These discs and the cross section of the shell are circular or approximately circular.

For restricting flow communication between compartments defined by the rotor discs the latter extend radially to the close proximity of the shell wall, leaving an annular slit which is generally not over 10 percent and, preferably, under 5 percent of the cross sectional area of the shell. The ample flow passages at the inner parts of the discs are provided by distributing the openings so that a substantial part thereof, viz., not less than 25 percent, is situated within the central half of the disc area. Stated otherwise, a substantial part of the openings should lie within the region circumscribed by a circle which is concentric with the disc and has a radius 0.71 of the disc radius. For optimum results the open area situated within the said circle should exceed the open area situated in the disc region outside of the said circle. Stated otherwise, the outer region of the disc has, on average, a smaller proportion of open area than the inner part.

It is advantageous, for attaining optimum and reliable formation of the ordered vortex patterns, to provide a total open area in the plane of each disc which is between about 40 and 60 percent of the cross sectional area of the shell in the said plane. Because the open area due to the annular slit between the rotor disc and the shell wall is not over 10 percent of the shell cross section, e.g., between 3 percent and 10 percent, this requirement is attained by providing openings in the discs which occupy between about 33 and 60 percent of the disc area.

The individual openings in the disc should be large enough to permit the drops of the dispersed phase in the vortices to pass through the openings when the disc is rotated at the speed required to create the ordered dispersion. They should, in general, have individual areas of at least one square centimeter, and openings larger than 2 square centimeters are preferred. These minimum dimensions of the openings will be larger, usually at least several times as large, as the thickness of the rotor disc. The openings may be regularly or otherwise distributed over different sectors of the disc. The openings may all be of the same shape and size, although this is not an essential requirement. The same considerations apply to the openings in the different rotor discs, which need not have the same shapes and sizes. The aggregate free area, moreover, need not be the same for all discs but may differ, for instance, according to the local liquid load at various rotor discs. In certain applications, as when one of the phases flows slowly or intermittently and backmixing is a problem, the open areas are alternately greater and smaller for successive discs; this may be achieved by varying the width of the annular slits between the discs and shell and/or the aggregate areas of the openings in the discs. As a result the flow strength of the vortices will be greater in certain compartments, by which a better exchange of components between the phases can be attained.

Moreover, it was found that for dependable operation the shell should have an internal diameter of at least 15 centimeters, and that the ordered vortex patterns and the controlled transfer of fluids between compartments essential for stage-wise operation are sometimes not attainable when smaller-diameter shells are used. While a cylindrical shell is usually employed, it is also possible to use one with a non-uniform diameter, thereby providing larger compartments where greater liquid loads occur or where prolonged contact is desired.

The distance between successive rotor discs, measured along the shaft axis, may, but need not be equal. It is preferred, however, to arrange at least some of the discs at equal intervals. A suitable interval between discs is, for example, 5 to 50 percent of the internal diameter of the shell.

The rotor shaft has a small cross sectional area, less than 10 percent and, preferably, not more than approximately 5 percent of the cross sectional area of the shell.

Regarding the secondary object of the invention, the rotor shaft is generally mounted by means of one or more bearings. It may happen that the bearing is surrounded by a medium which has a corrosive effect and/or is a poor lubricant, although one of the phases supplied to the contactor is free from these disadvantages. Under these conditions it is advisable to supply a part of the feed liquid of the said phase through the bearing by providing a branch conduit from the inlet for said phase. In this manner the bearing is lubricated and/or cooled, or at least flushed out with non-corrosive fluid.

The invention will be further described with reference to the accompanying drawing forming a part of this specification and showing, by way of illustration, two embodiments, wherein.

Figure 1:
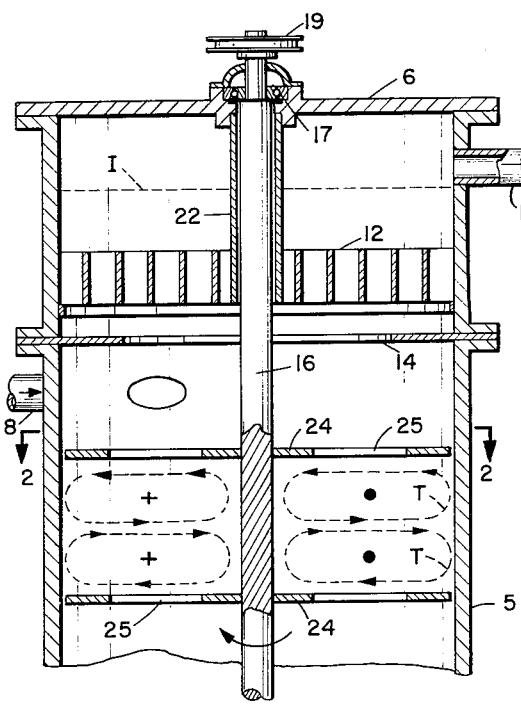
FIGURE 1 is a vertical sectional view of a contactor according to the invention.
Figure 2:
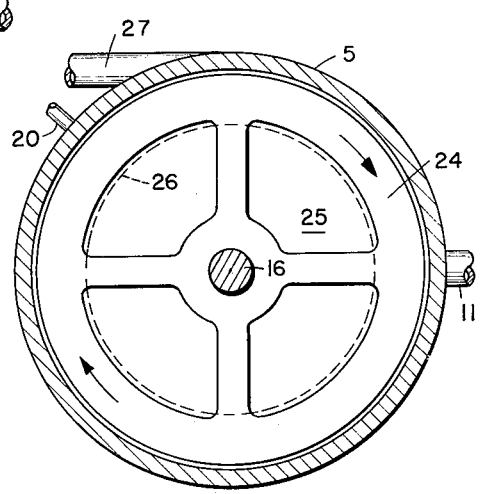
FIGURE 2 is a sectional view taken on the line 2—2 of FIGURE 1.

Referring to FIGURES 1 and 2, the contactor comprises a vertical, cylindrical shell 5, circular in cross section, having upper and lower closures 6 and 7, upper and lower inlet pipes 8 and 9, which may optionally be tangential as shown, and upper and lower discharge pipes 10 and 11, respectively. The shell may be provided with a jacket (not shown) for heating or cooling fluid (see U.S. Patent No. 2,804,379) and may contain at one or both ends a current-suppressing structure, such as an egg-crate structure 12 or 13, providing extended vertical walls which permit free flow of fluid but dampen rotary motion. This structure is often provided at the end toward which the dispersed phase settles. Near to each current-suppressing structure and beyond the respectively adjacent tangential inlet there is advantageously a flat, annular stator baffle 14 or 15 having a large central opening. A vertical rotor shaft 16 is mounted at the central axis of the shell in bearings 17 and 18, and is provided with suitable drive means, represented by a pulley 19. According to one feature of the invention, a small branch pipe 20 is connected from one of the inlet pipes, e.g., the inlet 9 to the bearing 18 via a lubricant chamber 21. The bearing 18 may be a radial-thrust bearing and is continuously pressure-lubricated and cooled by the liquid supplied through the inlet 9. This arrangement is suitable whenever the inlet to which the branch duct 18 is connected supplies a lubricant, e.g., lubricating oil, or a non-corrosive fluid. The size of the branched off stream is, of course, kept as small as possible consistent with protecting the bearing. Sleeves 22 and 23 are optionally mounted about the rotor shaft in the end zones beyond the current-suppressing structures to prevent liquid within these zones from being agitated by the shaft. These sleeves and the current-suppressing structures permit unhampered coalescence and settling of the dispersions in the end zones.

The shaft 16 carries a plurality of transverse, horizontal rotor discs 24, fixed at intervals along the shaft for rotation therewith within the otherwise uninterrupted chamber defined by the shell 5 between the stator baffles 14 and 15. These discs define contacting compartments. Each disc is formed of a thin, flat plate which is circular in outline, extends radially to the close proximity of the shell wall, and has a plurality, e.g., four large approximately sector-shaped openings 25. These openings are situated so that a substantial part, preferably over half, of the total open area between consecutive compartments (including the annular slit about the disc and the openings through it) lies within a circle (shown in broken lines at 26) having a diameter 0.71 of the internal diameter of the shell. In the embodiment illustrated, the areas of the slit and openings are, respectively, 5 and 41 percent of the shell cross section, so that the total open area is 46 percent; of this, the open area situated within the circle 26 is 76 percent of the total open area (85 percent of the open area within the disc).

Considering the discs alone, each one has an open area or 43 percent, of which 87 percent is situated within a circle 0.71 of the disc diameter.

An intermediate inlet 27 may be provided if two-solvent extractions are to be carried out.

The phases to be brought into contact with each other should differ in specific weight. In operating the contactor for counter-current operation the phases of higher and lower specific gravities are admitted continuously respectively through the inlets 8 and 9. Either of these phases may form a continuous phase while the other is dispersed, provided that the continuous phase is a liquid. The column is initially filled with the liquid which is to form the continuous phase and the following description applies to the case in which the denser liquid is continuous. The column being full of the denser liquid, e.g., furfural, the rotor is rotated in the arrow direction (this being preferably the same as the tangential direction of the inlets 8 and 9) and the lighter fluid, e.g., lubricating oil containing aromatic and non-aromatic constituents, is admitted, while admission of the heavier liquid is continued. A part of the oil flows via the branch pipe 20 to lubricate the bearing 18. Toroidal vortices T are set up within each compartment, with the fluids moving outwards adjacently to the rotor disc, reversing direction near the shell wall, and moving toward the shaft at the mid-level of each compartment. This causes dispersal of the lighter fluid (oil) in the heavier fluid (furfural). Superimposed on the vortical flow, there is a circular flow of fluids about the shaft in the same direction as the shaft rotation, indicated by dots (denoting arrow points) and crosses (denoting arrow tails). This circular flow is retarded by the stationary wall of the shell, creating shear in the fluids and leading to the continued formation of new interface between phases.

The greater part of the dispersion is recirculated by the vortices within each compartment, which leads to prolonged contact and good transfer of components between the phases, and the balance gravitates through the open area at each plane of a rotor disc. The relatively quiet zone beneath the structure 13 contains mainly the heavier phase, commingled with a few globules of the lighter liquid (carried down with the heavier liquid or emerging from the bearing) which readily settle upward because the rotational movements are checked by the structure 13 and sleeve 23. This heavier liquid (furfural containing dissolved aromatics) is discharged through the outlet 11 at a rate controlled by a flow controller (not shown) to maintain the level of the continuous phase at the level I in the relatively quiet upper end zone. The dispersion rising above the upper inlet 8 has its rotational movement checked by the structure 12 and is shielded from the shaft by the sleeve 22; this permits the dispersed droplets to settle above the interface I. The settled lighter fluid (extracted lubricating oil freed from aromatics and containing a small amount of dissolved furfural) is withdrawn through the structure 12, so that there is no net vertical flow of the latter liquid through this structure.

Occasionally, as in the case of a chemical reaction, new substances are formed in the compartments.

It is evident that the device may be provided with external settlers, as described in the aforesaid U.S. Patent No. 2,601,674.

The rate of rotation of the discs is so adjusted that one of the phases—the lighter phase in the case described above—remains distributed as an ordered dispersion throughout the column, except, of course, in the end zones. Hence the device does not involve alternate mixing of the phases followed by settling of the dispersed phase. Higher rotation speeds lead to finer dispersions and improved contacting. The speed of rotation must be kept below the flooding speed, at which the dispersions become so fine that insufficient transfer of fluid through the open areas occurs.

Figure 3:
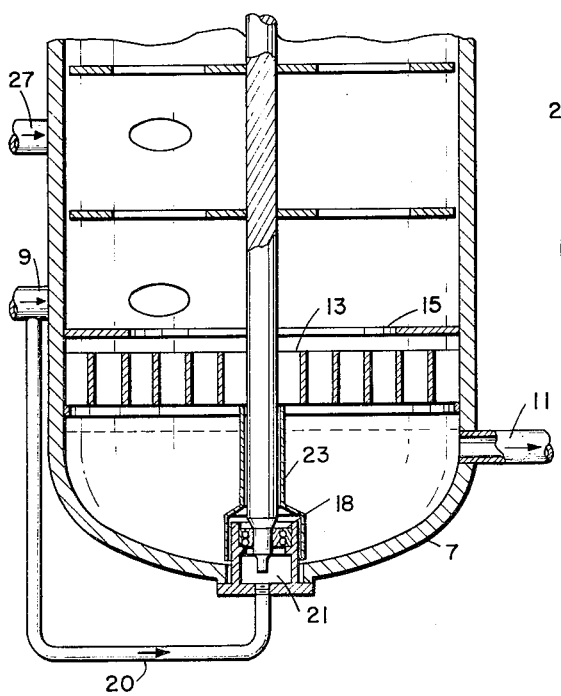
FIGURE 3 is a view similar to FIGURE 2 showing a modified rotor disc.
Figure 3:
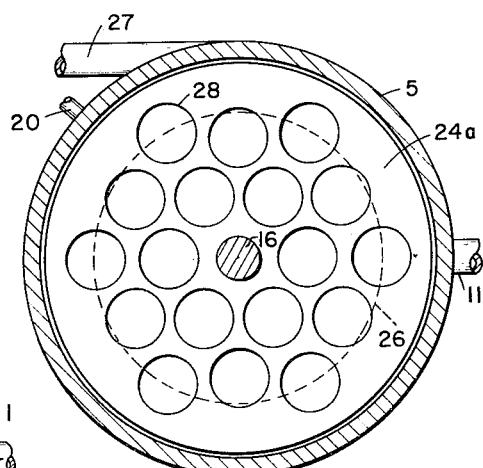

Referring to FIGURE 3, there is shown a circular rotor disc 24a according to a modified construction. The size of the disc is as described for the disc 24 but has a larger number of circular openings 28, distributed to concentrate the open area in the inner region of the disc, within the circle 26. Operation of this disc is as described above.

*Example*

A contactor constructed as shown in FIGURE 1 had an internal shell diameter of 30 cm. Each rotor disc has a thickness of 3 mm. and a diameter of 29 cm. and was provided with 54 openings circular, each 2.5 cm. in diameter, uniformly distributed over the disc surface. The open area was, therefore, 44 percent of the total cross sectional area of the shell.

To determine the maximum permissible load, water and kerosene were flowed countercurrently at room temperature and atmospheric pressure; water was the heavier and continuous phase and the kerosene was dispersed. With flow rates of 1 cu. meter per hr. of each of the liquids and a rotor shaft speed of 100 rev. per min., there was no flooding; the droplet size of the dispersed phase was approximately 1 to 2 mm. The flooding limit was reached at a rotor speed of 125 rev. per min. With liquid feed rates twice those given above, the flooding limit was reached at a speed of 75 rev. per min.; in this case the droplet size of the dispersed phase was less than 3 mm. In both cases, substantially water-free kerosene and kerosene-free water discharged at the outlets 10 and 11, respectively.

The apparatus is suitable, for example, for extraction of liquids by means of selective solvents at atmospheric or superatmospheric pressure. An example is the extraction of lubricating oil with furfural at atmospheric pressure to remove aromatic hydrocarbons; another is the extraction of aromatics from kerosene by means of liquid sulfur dioxide at elevated pressure.

The apparatus may also be used for carrying out chemical reactions, for example, the preparation of isopropyl alcohol from propylene and sulfuric acid.

The apparatus may further be applied to processes in which solids occur in one or both of the phases admitted. Thus, it may be applied to the separation of one or more components from a mixture by means of an adsorbent; in this case the said mixture forms one phase and a finely divided adsorbent the other. An example of such an application is the separation of a mixture of paraffins and iso-paraffins or of an alcohol-water mixture by means of molecular sieves, such as zeolites. The apparatus may also be used in a similar way in ion-exchange processes.

One of the phases may consist of a suspension of a solid in a liquid. This is the case, for example, in washing and, if necessary, neutralizing mother liquor from a crystalline mass. Thus, in the production of potassium nitrate from potassium chloride and nitric acid, a suspension of potassium nitrate crystals is formed in an acid mother liquor; these crystals may then be purified by counter-current treatment with an auxiliary liquid containing an alkali hydroxide. The suspension is introduced at the top of the shell and the auxiliary liquid at the bottom; the purified crystals are discharged at the bottom as a suspension in the auxiliary liquid.

The apparatus may also be used for carrying out a two-solvent extraction. The mixture to be separated is then introduced at some point between the top and the bottom of the series of rotor discs, e.g., through an intermediate inlet 27; the two extraction solvents, which differ in specific weights, are introduced at the ends through the inlets 8 and 9. An example is the extraction of ethereal oils with pentane and alcohol.

When more than two phases occur there is one continuous phase in which the other phases are dispersed.

I claim:

1. A rotating disc contactor comprising a tubular shell providing a mechanically uninterrupted chamber, one end of which is higher than the other; a rotor shaft which is substantially coaxial with said chamber and is mounted for rotation therein; means for rotating said shaft; a plurality of discs fixed on said shaft at axially spaced intervals within said uninterrupted chamber and disposed transversely thereto for rotation with the shaft, said discs extending radially to the close proximity of the chamber wall so that only narrow annular slits are left between the disc and wall, the discs having openings therein for the passage of fluid through the discs, said openings being distributed so that the major part of the open area is situated within a circle of radius 0.71 of the disc radius and concentric with the disc; and means for introducing and discharging fluid at axially displaced points in said shell.

2. A contactor according to claim 1 wherein the total open area transverse to the chamber axis in the plane of each disc is between 40 and 60 percent of the cross sectional area of the chamber.

3. A contactor according to claim 1 wherein the area of each said annular slit is not over 10% of the cross sectional area of the chamber and the total open area transverse to the chamber axis in the plane of each disc is between 40 and 60 percent of the cross sectional area of the chamber.

4. A contactor according to claim 1 wherein the diameter of said chamber is at least 15 centimeters and each opening through the discs has an area of at least 1 square centimeter.

5. A rotating disc contactor comprising a tubular shell providing a mechanically uninterrupted chamber one end of which is higher than the other; a rotor shaft which is substantially coaxial with said chamber and is mounted for rotation therein; means for rotating said shaft; a plurality of discs fixed on said shaft at axially spaced intervals within said uninterrupted chamber and disposed transversely thereto for rotation with the shaft, said discs extending to the close proximity of the chamber wall so that only narrow annular slits are left betwen the disc and wall, the discs having openings therein for the passage of fluid through the discs, the openings having an aggregate area between 33 and 60 percent of the disc area and a substantial part of said openings being situated within a circular area of radius 0.71 the disc radius and concentric to the disc.

6. A rotating disc contactor comprising a tubular shell providing a mechanically uninterrupted chamber, one end of which is higher than the other; a rotor shaft which is substantially coaxial with said chamber and is mounted for rotation therein; means for rotating said shaft; a plurality of discs fixed on said shaft at axially spaced intervals within said uninterrupted chamber and disposed transversely thereto for rotation with the shaft, said discs extending radially to the close proximity of the chamber wall so that only narrow annular slits are left between the disc and wall, the discs having openings therein for the passage of fluid through the discs, said openings being distributed so that the region of the disc which is situated within a circle of radius 0.71 of the disc radius and concentric with the disc has a substantially greater open area than the open area in the region of the disc which is situated outside of said circle; and means for introducing and discharging fluid at axially displaced points in said shell.

7. A contactor according to claim 6 wherein the area of each said annular slit is not over 10% of the cross sectional area of the chamber and the total open area transverse to the chamber axis in the plane of each disc is between 40 and 60 percent of the cross sectional area of the chamber.

References Cited in the file of this patent

UNITED STATES PATENTS

| | | |
|---|---|---|
| 2,139,871 | Wilson et al. | Dec. 13, 1938 |
| 2,347,195 | Huff | Apr. 25, 1944 |
| 2,479,265 | Roshong | Aug. 16, 1949 |
| 2,731,173 | Harrigan | Jan. 17, 1956 |
| 2,955,924 | Smith | Oct. 11, 1960 |